Figure 1:
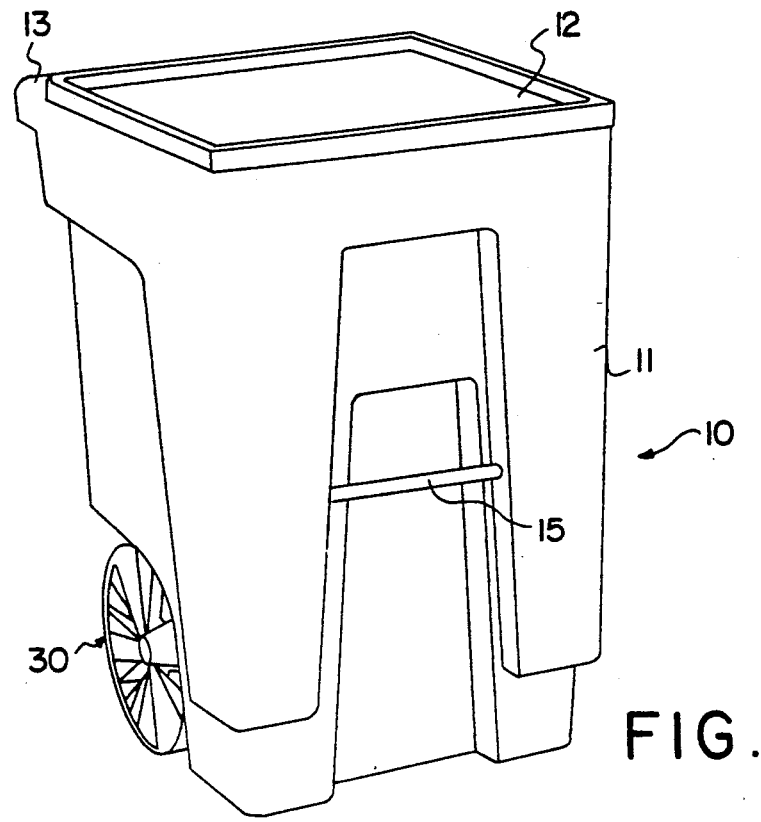

United States Patent [19]

Prout et al.

[11] Patent Number: 5,104,200
[45] Date of Patent: Apr. 14, 1992

[54] HEAVY-DUTY BLOW-MOLDED WHEEL AND ROLL-OUT WASTE CONTAINER WITH HEAVY-DUTY BLOW-MOLDED WHEEL

[75] Inventors: John T. Prout, Winston-Salem; Billy R. Cagle, Mooresville, both of N.C.

[73] Assignee: Toter, Inc., Statesville, N.C.

[21] Appl. No.: 549,369

[22] Filed: Jul. 6, 1990

[51] Int. Cl.⁵ .................... B60B 5/02; B60B 3/12
[52] U.S. Cl. ..................... 301/63 DD; 301/63 PW; 301/64 SH
[58] Field of Search ......... 301/63 PW, 63 DD, 64 R, 301/64 SH, 5 R; 152/323

[56] References Cited

U.S. PATENT DOCUMENTS

| | | | |
|---|---|---|---|
| 1,102,193 | 6/1914 | Horn et al. | 301/64 SH |
| 1,420,337 | 6/1922 | Palmer | 301/63 DD |
| 1,470,742 | 10/1923 | Ibach | 301/64 SH |
| 1,586,425 | 5/1926 | Goodyear | 301/63 DD X |
| 1,599,845 | 9/1926 | Shoemaker | 301/63 DD |
| 2,629,420 | 2/1953 | Walklet | 301/63 DD X |
| 3,977,454 | 8/1976 | Coran et al. | 301/63 PW X |
| 4,444,435 | 4/1984 | Honsa | 301/63 PW |
| 4,674,759 | 6/1987 | Parker | 301/63 PW X |

FOREIGN PATENT DOCUMENTS

| | | | |
|---|---|---|---|
| 219469 | 4/1957 | Australia | 301/63 DD |
| 13859 | 7/1899 | United Kingdom | 301/64 SH |

Primary Examiner—Russell D. Stormer
Attorney, Agent, or Firm—W. Thad Adams, III.

[57] ABSTRACT

A heavy-duty, wear resistent, blow-molded plastic wheel comprising a circular web defining a central axle bore, an integrally-formed radially-extending peripheral side wall, and an integrally-formed, axially-extending tread, the side wall having a width no greater than one-fourth the width of the tread. A roll-out type, plastic waste container having a waste-receiving container body, a handle, a lifting bar and wheel mounts is provided in combination with a heavy-duty, wear resistant, blow-molded plastic wheel as described above mounted on the wheel mounts.

22 Claims, 3 Drawing Sheets

HEAVY-DUTY BLOW-MOLDED WHEEL AND ROLL-OUT WASTE CONTAINER WITH HEAVY-DUTY BLOW-MOLDED WHEEL

TECHNICAL FIELD AND BACKGROUND OF THE INVENTION

This invention relates to a heavy duty blow molded wheel adaptable for many purposes but described in this application for particular use with a roll-out waste container of the type commonly used by waste haulers and municipalities for "street-side" waste collection.

One-piece molded plastic wheels are known in the prior art. However, prior art wheels are designed to resemble older-type pneumatic or semi-pneumatic wheels. Generally, this means that the side wall and tread portions of the plastic wheel are designed to resemble the rubber tire portion of a pneumatic or semi-pneumatic wheel, included a rounded tread area and a rounded, relatively thick width side wall.

There are, of course, reasons why a pneumatic tire has a rounded tread and side wall cross-section. Since the tire is filled with pressurized air, the tire will naturally want to assume a rounded cross-section since the air is pressing with equal force on all interior parts of the tire. Furthermore, since a pneumatic tire is designed to compress under weight and to absorb and cushion irregularities in the rolling surface, a relatively thick width side wall is required so that the tire will not be compressed to the point where the tread bottoms out on the wheel rim under heavy impact or weight loads. In other words, the side wall needs to be benefits offered by pneumatic and semi-pneumatic rubber tires.

These considerations to not apply in the use of plastic wheels. Plastic wheels are relatively stiff and brittle in comparison to rubber tires. Of course, plastic wheels are not pneumatic. They are generally used in situations where loads are not great, and on relatively even surfaces where it is not necessary to cushion impact on the wheel, for example on roll-out waste containers.

However, roll-out waste containers are becoming larger and are designed to carry much heavier loads. For these reasons, conventionally designed plastic wheels are now subject to crushing due to heavy loads placed on them. This crushing usually occurs in the side-wall area, which has a relatively thin cross-sectional dimension. Since the side wall area is generally perpendicular, or normal, to the direction of load application, the side walls are caused to bulge out under load. The relatively brittle plastic is not designed to flex to any substantial degree, and for this reason the side wall breaks down, damaging the wheel and eventually requiring replacement.

Of course, the cross-sectional thickness of the side wall can be made progressively greater to withstand heavier loads, or the volume occupied by the side walls and the tread could even be made nearly or completely solid. However, this complicates the molding process, uses more plastic material, and results in a heavier wheel.

It has been discovered that a wheel which will withstand heavy-duty loads without damage can be made using no more or even less material by substantially reducing the width of the side walls in proportion to the width of the wheel tread. The width of the side wall is therefore substantially smaller in relation to its own cross-sectional thickness, and the side wall is able to withstand much greater loads.

SUMMARY OF THE INVENTION

Therefore, it is an object of the invention to provide a heavy-duty blow-molded wheel having a crush-resistent side wall area.

It is another object of the invention to provide a heavy-duty blow-molded wheel which has a side wall cross-sectional thickness which is relatively large in relation to its width.

It is another object of the invention to provide an integrally-formed one piece blow molded wheel which has a side wall cross-sectional thickness which is relatively large in relation to its width.

These and other objects of the present invention are achieved in the preferred embodiments disclosed below by providing a heavy-duty, wear resistent, blow-molded plastic wheel comprising a circular web defining a central axle bore, an integrally-formed radially-extending peripheral side wall, and an integrally-formed, axially-extending tread, the side wall having a width no greater than one-fourth the width of the tread.

According to one preferred embodiment of the invention, the wheel includes a plurality of radially-outwardly extending, spaced-apart spokes having a predetermined thickness and separated by web portions having a thickness less than the thickness of the spokes to define relief areas between the spokes.

According to another preferred embodiment of the invention, the wheel includes a plurality of integrally-formed and spaced-apart stiffening lugs adjacent the side wall and projecting inwardly towards the axle-bore.

According to yet another preferred embodiment of the invention, the side wall has a width no greater than one-sixth the width of the tread.

According to one preferred embodiment of the invention, the side wall is approximately one-quarter inch (6 mm) in width and the tread is approximately one-and-three-quarters inch (44 mm) in width.

According to another preferred embodiment of the invention, the wheel includes five outwardly-extending, relatively thick spokes separated by five web portions of reduced thickness.

Preferably, the wheel includes a five integrally-formed and spaced-apart stiffening lugs adjacent the side wall and projecting inwardly towards the axle-bore in alternate web portions.

Preferably, the web portions are normal to the plane of the tread.

According to one preferred embodiment of the invention, the side wall and the tread define an enclosed hollow area.

According to yet another preferred embodiment of the invention, the web surrounding the axle bore defines an enclosed hollow area.

According to one preferred embodiment of the invention, the side wall and the tread define an enclosed hollow area and wherein the web surrounding the axle bore defines an enclosed hollow area, each of the hollow areas being generally triangular in cross-section.

According to another preferred embodiment of the invention, a roll-out type, plastic waste container having a waste-receiving container body, a handle, lifting means and wheel-mounting means is provided in combination with a heavy-duty, wear resistent, blow-molded plastic wheel mounted on the wheel-mounting means and 28 of hook material and third and fourth panels 30 and 32 of loop material. In this embodiment, outside or rear surfaces 12a and 18a of elongated section 12 and crosspiece 18 preferably consist entirely of loop material.

Figure 2:
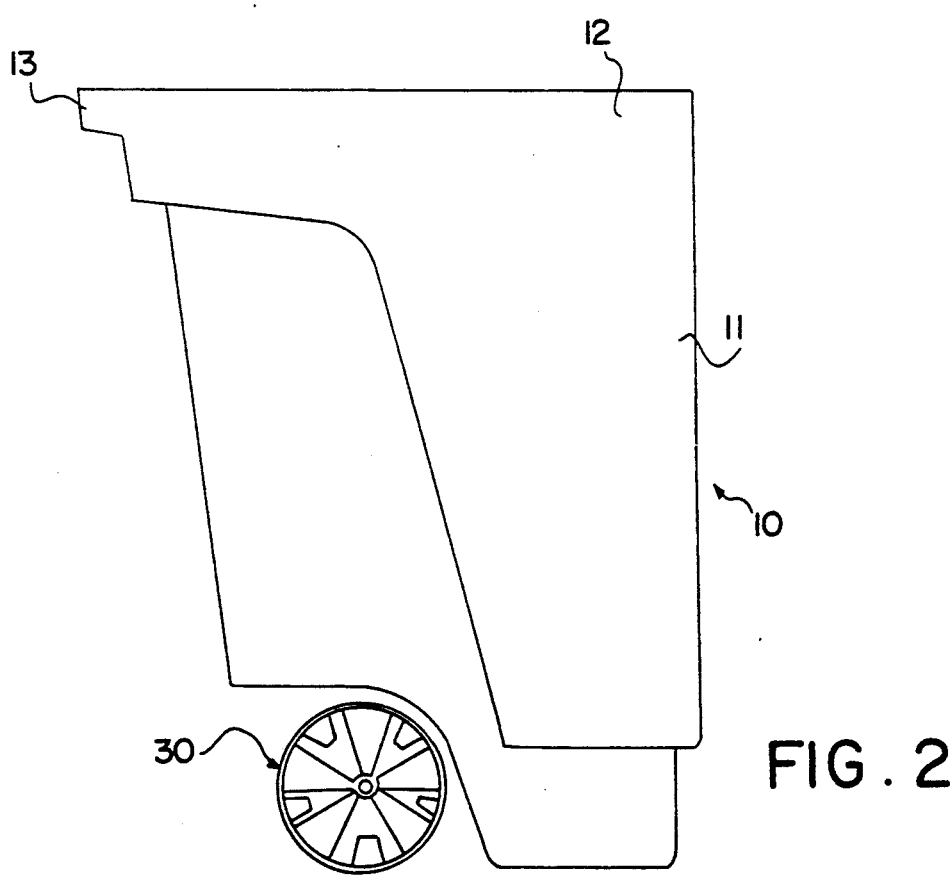
Figure 3:
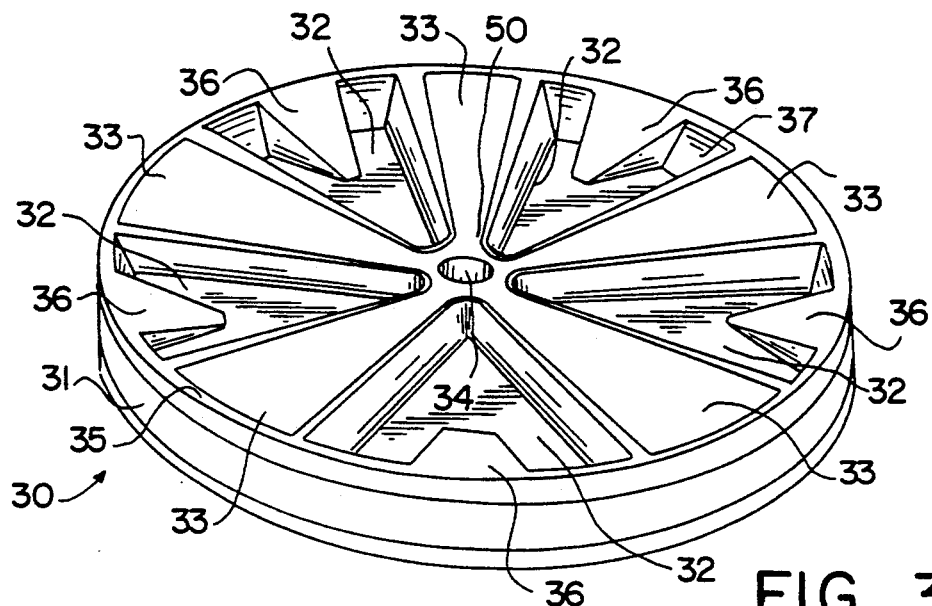
Figure 4:
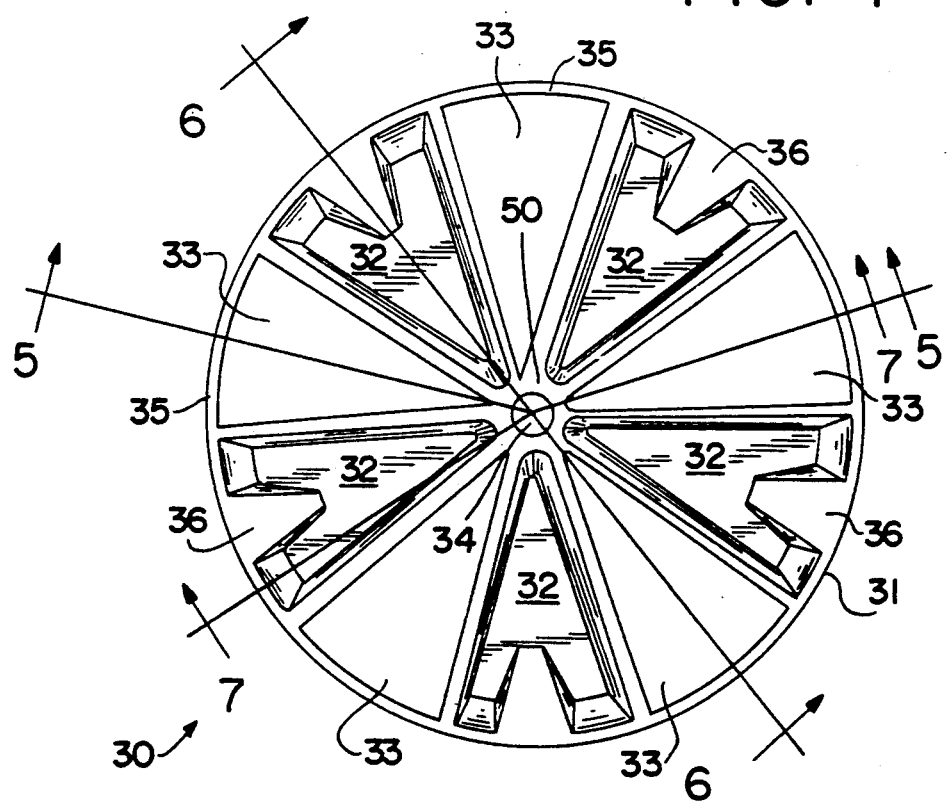
Figure 5:
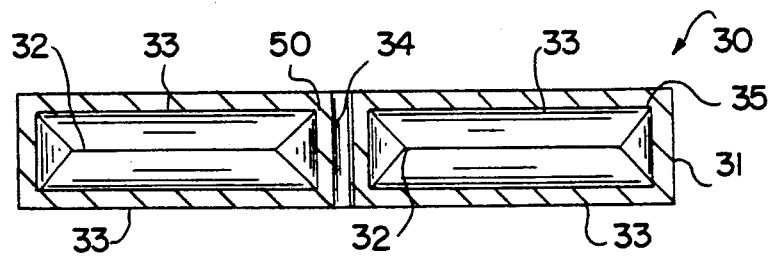
Figure 6:
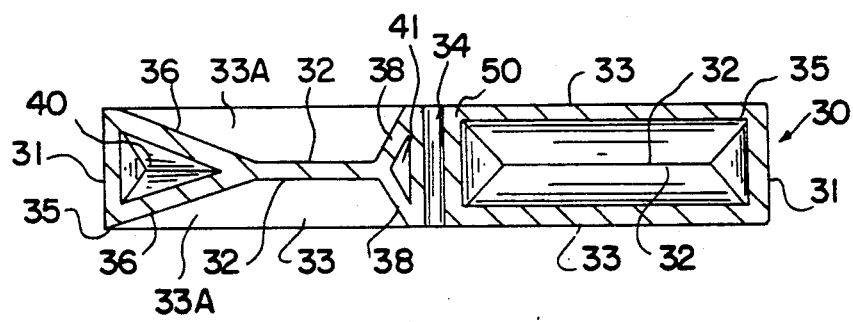

In one preferred embodiment, the article holder of the present invention is constructed from strips of hook and loop material that are two inches in width. With reference to FIG. 2, panel section 20 is 10½" in length, panel section 22 is 4" in length, panel section 24 is ½" in length, panel sections 26 and 28 are both 4" in length, and panel sections 30 and 32 are both ½" in length. Thus, elongated section 12 is a total of 15" long and crosspiece 18 is 11" long. The above dimensions and relative positioning of the panels of hook and loop material are considered preferred for the embodiment of the present invention shown in the figures. However, it should be appreciated that other dimensions and proportions are suitable for providing an article holder falling within the spirit and scope of the present invention.

Hook and loop material is typically available in strips or sheets having the desired material (hook or loop) on one surface and a fabric backing on the other. The article holder of the present invention is easily manufactured from several strips of hook and loop material cut to the desired dimensions and bonded together—backing surface to backing surface—with a suitable adhesive, or stitched or otherwise secured together (not shown).

Having described a preferred embodiment of the structure of article holder 10, the adaptability and reconfigurability thereof will now be demonstrated and described with reference to FIGS. 3-7, showing the sequence of steps used to retain a variety of different articles with article holder 10.

FIGS. 3A-C show the sequence of steps for reconfiguring article holder 10 to retain a flashlight 40 and provide a loop for hanging the article holder and flashlight from a belt 50 of a user. As shown in FIGS. 3A and B, elongated section 12 is folded in half inwardly on top of itself and releasably retained in that position by the cooperation between hook panel 2 and loop panel 20. Folding section 12 in half as shown provides a loop 38 through which a belt 50 may be received to suspend the article holder and device retained therein. Flashlight 40 is placed against the folded-over section at the location of the intersection of panels 12 and 18 and transverse panels 14 and 16 are folded inwardly therearound, as shown. Article holder 10 is retained in the configuration shown by the cooperation of either hook panel 26 or 28 with the outside surface 18a of section 18, which is loop material. Thus, as shown in FIG. 3C, flashlight 40 is retained by article holder 10 and the entire assembly is suspended from belt 50.

FIGS. 4A-E shows the sequence of steps in which article holder 10 is reconfigured to retain a pair of handcuffs 60 and suspended from a belt 50. As shown in FIGS. 4A and B, distal end 21 of panel 20 is folded inwardly against itself and handcuffs 60 are placed at the location of the intersection of section 12 and section 18 (FIG. 4B). Transverse sections 14 and 16 are then folded inwardly across handcuffs 60 forming a crisscross and covering the handcuffs. The opposite end of section 12 is then slid under belt 50 and the "cradle" 62 formed around handcuffs 60 is folded downwardly so as to suspend the assembly from belt 50. Finally, hook panel 22 of section 12 is folded upwardly and cooperates with the exposed loop material of section 18a to retain handcuffs 60 in cradle 62 and hanging the assembly from belt 50 (as shown in FIGS. 4C-E).

FIGS. 5A-D show the steps in the sequence used to reconfigure article holder 10 to retain a tape recorder 70 and for hanging the assembly from a belt 50. As shown in FIGS. 5A and B, tape recorder 70 is placed at the location of the intersection of sections 12 and 18, on the inside surface thereof. Section 12 if folded upwardly and inwardly about recorder 70 and transverse sections 14 and 16 are folded inwardly therearound to form a cradle 72 therefor, with one of hook panels 26 or 28 cooperating with rear surface 12a (loop material) of section 12 to retain the recorder. Finally, panel section 22 of section 12 is slid under belt 50 and folded over and downwardly to close article holder 10 around recorder 70 and suspend the entire assembly from belt 50. Panel section 22 (hook material) cooperates with rear surface 18a (loop material) of section 18 to releasably "close" the article holder and retain the recorder.

Figure 7:
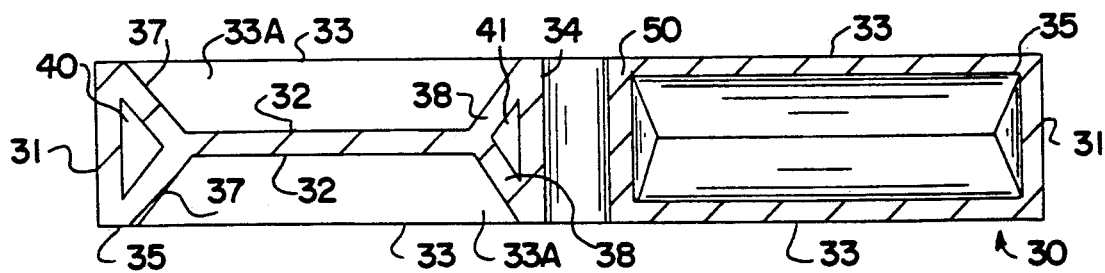

FIGS. 6A and B show article holder 10 retaining a police baton 80; the steps for this reconfiguration are substantially the same as those for the flashlight shown in FIGS. 3A-C. Finally, FIG. 7 shows the article holder of the present invention in a partially unfolded position with a can of spray mace 90 set in place to be retained following the same sequence of steps used to retain tape recorder 70.

It will be appreciated that the article holder of the present invention is easily adaptable and reconfigurable to retain a wide variety of articles in addition to those specifically disclosed and described herein.

What is claimed is:

1. An article holder reconfigurable and adaptable to releasably retain one of a variety of articles, comprising:
   a flexible body comprising an elongated section having first and second ends and first and second transverse sections extending perpendicularly outwardly from said elongated section nearer said first end than said second end of said elongated section, said body being substantially T-shaped when in an unfolded, planar orientation,
   said elongated section having a first surface comprising loop material and a second surface comprising a first panel of loop material extending from said first end of said elongated section at least one-half the length of said elongated section, a second panel of loop material extending from said second end of said elongated section, said second panel of loop material being substantially shorter than said first panel of loop material, and a panel of hook material disposed between said first and second panels of loop material,
   said first and second transverse sections each having a first surface comprising only loop material, said transverse sections each having a distal end and a second surface comprising a panel of hook material adjacent said elongated section and extending outwardly therefrom a substantial portion of the length of said transverse section, and a panel of loop material adjacent said panel of hook material and extending to said distal end of said transverse section,
   wherein said panels of hook and loop material cooperate to releasably secure said holder in a desired configuration to retain a desired article, said elongated section serving the functions of forming a cradle for the article retained therein, providing a 3. A heavy-duty blow-molded wheel according to claim 2, wherein said web portions are normal to the plane of the tread.

4. A heavy-duty blow-molded wheel according to claim 1, wherein said wheel includes a plurality of integrally-formed and spaced-apart stiffening lugs adjacent said side wall and projecting inwardly towards the axle-bore.

5. A heavy-duty blow-molded wheel according to claim 1, wherein said side wall has a width no greater than one-sixth the width of the tread.

6. A heavy-duty blow-molded wheel according to claim 1 or 5, wherein said side wall is approximately one-quarter inch (6 mm) in width and said tread is approximately one-and-three-quarters (44 mm) inches in width.

7. A heavy-duty blow-molded wheel according to claim 1 or 5, wherein said wheel includes five outwardly-extending, relatively thick spokes separated by five web portions of reduced thickness.

8. A heavy-duty blow-molded wheel according to claim 7, wherein said wheel includes a five integrally-formed and spaced-apart stiffening lugs adjacent said side wall and projecting inwardly towards the axle-bore in alternate web portions.

9. A heavy-duty blow-molded wheel according to claim 1 or 5, wherein said side wall and said tread define an enclosed hollow area.

10. A heavy-duty blow-molded wheel according to claim 1 or 5, wherein said web surrounding said axle bore defines an enclosed hollow area.

11. A heavy-duty blow-molded wheel according to claim 1 or 5, wherein said side wall and said tread define an enclosed hollow area and wherein said web surrounding said axle bore defines an enclosed hollow area, each of said hollow areas being generally triangular in cross-section 12. In a roll-out type, plastic waste container having a waste-receiving container body, a handle, lifting means and wheel-mounting means, the combination therewith of a heavy-duty, wear resistent, blow-molded plastic wheel mounted on said wheel-mounting means and comprising:
  (a) an integrally-formed circular web defining a central axle bore;
  (b) two radially extending peripheral side walls having a plurality of axially spaced-apart spokes alternating with a plurality of axially-joined webs of increased pressure resistance extending radially outwardly from adjacent the axle bore;
  (c) an axially extending tread integrally formed with said side walls and connecting said side walls around the peripheral edge of the wheel;
  (d) said side walls adjoining the tread in the area of the axially-joined webs having a radial width no greater than one-forth the width of the tread to reduce compression to the tread area of the wheel when the wheel is under extreme loads.

13. In a waste container according to claim 12, wherein said wheel includes a plurality of radially-outwardly extending, spaced-apart spokes having a predetermined thickness and separated by web portions having a thickness less than the thickness of the spokes to define relief areas between said spokes.

14. In a waste container according to claim 13, wherein said web portions are normal to the plane of the tread.

15. In a roll-out type, plastic waste container according to claim 12, wherein said wheel includes a plurality of integrally-formed and spaced-apart stiffening lugs adjacent said side wall and projecting inwardly towards the axle-bore.

16. In a waste container according to claim 12, wherein said side wall has a width no greater than one-sixth the width of the tread.

17. In a waste container according to claim 12 or 16, wherein said side wall is approximately one-quarter inch (6 mm) in width and said tread is approximately one-and-three-quarters inches (44) in width.

18. In a waste container according to claim 12 or 16, wherein said wheel includes five outwardly-extending, relatively thick spokes separated by five web portions of reduced thickness.

19. In a waste container according to claim 18, wherein said wheel includes a five integrally-formed and spaced-apart stiffening lugs adjacent said side wall and projecting inwardly towards the axle-bore in alternate web portions.

20. In a waste container according to claim 12 or 16, wherein said side wall and said tread define an enclosed hollow area.

21. In a waste container according to claim 12 or 16, wherein said web surrounding said axle bore defines an enclosed hollow area.

22. In a waste container according to claim 12 or 16, wherein said side wall and said tread define an enclosed hollow area and wherein said web surrounding said axle bore defines an enclosed hollow area, each of said hollow areas being generally triangular in cross-section.

* * * * *